3,580,934
CORROSION PREVENTION WITH SODIUM
SILICATE AND SOLUBLE ZINC SALTS
William Bruce Murray, Long Beach, and Roy E. Wright,
Oakland, Calif., assignors to Philadelphia Quartz Company of California, Berkeley, Calif.
No Drawing. Continuation-in-part of application Ser. No. 584,373, Oct. 5, 1966. This application Nov. 26, 1969, Ser. No. 880,365
Int. Cl. C23f 11/18
U.S. Cl. 252—389                                    9 Claims

ABSTRACT OF THE DISCLOSURE

A process for retarding corrosion in metal tubes carrying water by treating said tubes with a combination of sodium silicate and a soluble zinc salt, and with the optional addition of a chelating or sequestering agent.

RELATED CASE

This application is a continuation-in-part of parent application Ser. No. 584,373, now abandoned.

BACKGROUND

Municipal water with high total dissolved solids and high dissolved oxygen is often extremely aggressive to iron, steel, copper, and brass. Sacrificial metal systems are effective but are very expensive to establish and difficult to design. Treatment with sodium polyphosphates at high concentrations is only moderately effective and, furthermore, they deleteriously affect the sanitary quality of the water in the distribution system by encouraging biological growths whereas the silicate presents no similar problem. We have found, too, that in spite of the greatly increased corrosion in untreated hot water of similar composition, our treatment is still effective in retarding corrosion and the retardation is active in providing protection over long distances in the distribution system. A fingerprint on a test piece of iron was still visible after exposure to a run of 1,000,000 gallons of water.

PRIOR ART

Use of soluble silicates for the prevention of corrosion in metal pipes is described in ACS Monograph #116 Volume II, "Soluble Silicates," by Vail, pages 248–259. In general, it is understood that a higher proportion of colloidal silica, of the order of 20 p.p.m., will be used initially and that after a film has been formed on the inside of the iron pipe only about 4 p.p.m., or less, of $SiO_2$ will be required. In brine solutions, as much as 40 p.p.m. of $SiO_2$ has been used.

U.S. Pat. 3,215,637 to Clerbois shows much higher concentrations of sodium silicate with zinc salts for use in brine solutions. These concentrations are of the order of 500 p.p.m. U.S. Pat. 2,188,311 also shows high concentrations of sodium silicate and zinc salts in solutions which under electrolysis will form a precipitate at points of leakage.

While zinc salts have been used with other protective agents, such as chromates and molybdates, and it is known to include sulfamic acid or polyphosphates to help prevent precipitation of the zinc in alkaline solutions, the specific effect of the combination which we have found does not appear to have been noticed.

In applying our process to metallic water distribution systems we have found that the ratio of sodium silicate solution to zinc ion should be about 10 to 1 by weight. This may vary from about 5 to 1, and the preferred proportions will depend in part on the $Na_2O:SiO_2$ ratio of the sodium silicate solution employed. Since aqueous sodium silicate solution reacts with soluble zinc salts to precipitate a zinc silicate, we have found it convenient to add the sodium silicate by bleeding it into the stream of water and then at a point further downstream, after the silicate is dispersed, we add the soluble zinc salt, preferably chelated by the addition of sulfamic acid ($HSO_3NH_2$). In general, we prefer to add zinc sulfamate directly, but other equivalent chelating and sequestering agents are well known. A useful composition has the approximate proportions of 12.5 parts by weight of sulfamic acid, 11.1 parts by weight of zinc sulfate monohydrate (36% Zn), and 100 parts by weight of water.

In most alkaline systems, tetrasodiumethylenediamine tetraacetate (EDTA), or sodium hexametaphosphate, are preferred. A composition having approximately the following formula:

|  | Parts by weight |
|---|---|
| Sulfamic acid | 12.5 |
| Zinc sulfate monohydrate | 11.1 |
| Sodium hexametaphosphate | 12.0 |
| Water | 100 | is stable up to about pH 12.1 without the precipitation of zinc hydroxide.

The sodium silicate may vary from solutions having a ratoi of $Na_2O:SiO_2$ of about 1:1.6 to 1:4 or higher, if such solutions become available. The amount of silica added as sodium silicate may vary from about 2 p.p.m. to about 100 p.p.m., but usually for the protection of potable waters and ordinary cooling waters an initial film will be deposited with a solution containing from 10 to 20 p.p.m. of $SiO_2$ and will be maintained with a solution containing approximately 2 p.p.m. of $SiO_2$ although this may vary from 2 to 10 p.p.m.

Naturally, soluble silicates of equivalent alkali metals may be used and soluble dry forms may be substituted for the liquids if preferred. These dry forms may be composited with soluble dry forms of the sacrificial metal salts and/or the chelating and sequestering agents.

Various soluble zinc salts or other sacrificial metal salts may be used. While a ratio of 30 p.p.m. of alkali silicate or 8 p.p.m. of $SiO_2$ to 3 p.p.m. of zinc ion is usually satisfactory in ordinary potable and cooling water systems to start, the relation may be about 2 to 5 p.p.m. of $SiO_2$ and 1 p.p.m. of Zn after the film forms. Considerably smaller proportions of zinc may be used as the proportion of zinc in the thin protective film coating the pipe is very low. The thin surface film forms faster in the presence of Zn ion than with silicate alone and the film itself is more permanent since it will remain two or more days after cessation of the treatment.

The sulfamic acid or other chelating and sequestering agent should be present in sufficient amount to prevent the precipitation of the zinc as zinc hydroxide. Thus the chelating agent will usually be equivalent to the zinc salt present. Other sequestering agents are sometimes useful and a combination of sodium silicate with polyphosphate is often found to be more effective than either alone.

As stated above, these metal salts as well as the chelating and/or sequestering agents may be added to the water as a solution or in a soluble dry form either alone or mixed, preferably they are added after the soluble silicate has dispersed.

The protection of municipal water distribution systems is a matter of major economic significance. In one municipality, for instance, as much as 1 billion gallons per day of corrosive water passes through the mains and attacks not only the metal mains but the piping in the houses, apartments and commercial establishments which make up the city. In total, the corrosive effect necessitates large expenditures for the replacement of the distribution system. With ordinary treatment using sodium silicate at the rate of about 8 p.p.m. of $SiO_2$, a total of 80,000 pounds per day of a sodium silicate having a ratio of $1Na_2O:3.22SiO_2$ (9% $Na_2O$) would be required after the initial stabilizing period, and in a water with a high solids content and a concentration of dissolved oxygen the retardation of corrosion allows much to be desired. In the following example, the effect of adding zinc salts to sodium silicate and sodium hexametaphosphate inhibiting systems is disclosed. Sodium silicate alone reduced the corrosion only 13%. Sodium hexametaphosphate buffered with zinc reduced the corrosion by 40%, whereas silicate buffered with zinc reduced the rate of corrosion of the iron by 75%.

EXAMPLE 1

In a system using a brass pipe, iron specimens insulated from the brass were inserted into the stream of water. One specimen was inserted in the system before the addition of the treating agents and the second specimen was inserted following the injection of the reactants. A connection was made with the brass piping to determine the flow of current between the iron specimen and the brass piping system. One million gallons of a water aggressive to iron and having a high total dissolved solids and a high dissolved oxygen content was passed through the system at the rate of 15 gallons per minute. The weight loss of the test specimens was determined at the conclusion of the test. During the test, instantaneous corrosion rates were determined by shorting the individual iron specimens to the brass plumbing through a milliampere meter. This test indicated whether or not an impervious electrical resistance scale was being deposited on the after-treatment test specimen as a result of chemical treatment. In one test, sodium hexametaphosphate buffered with zinc was used at the rate of 10 p.p.m. of sodium hexametaphosphate. In another, 20 p.p.m. of the sodium silicate solution (5.3 p.p.m. $SiO_2$) described above was used. In a third test, with somewhat different water, 30 p.p.m. of the silicate solution 8 p.p.m. $SiO_2$) and 3 p.p.m. of zinc ion, as zinc sulfate $7H_2O$, was run for 1 week. For the remainder of the period the treatment was run at 10 p.p.m. of the silicate solution (2.7 p.p.m. $SiO_2$) and 1 p.p.m. of zinc ion. The sodium silicate was injected into the system first and the chelated zinc sulfate was added sufficiently far downstream to avoid precipitation. The instantaneous corrosion rate was variable in the water before treatment, ranging from about 6 to 15 ma. (milliamperes). With the addition of the sodium hexametaphosphate, the instantaneous corrosion rate was reduced to about 4 to 5 ma. after the first two weeks. With the sodium silicate alone, the instantaneous corrosion rate varied from about 5 to 8 after the first 2 weeks. However, with the mixed silicate-zinc sulfate treatment, the instantaneous corrosion rate never went above 3 and varied from about 1.2 to 3 over the whole period.

After the 48 days test period, samples were removed and weighed after cleaning off the corrosion products. Without treatment, the weight loss varied from about 10 to 17 grams where initial weight was about 510 grams. In the case of the hexametaphosphate treatment, the weight loss was 6.2 grams which indicated a weight loss reduction of, at best, about 40%. With the sodium silicate alone at 20 p.p.m. of $SiO_2$, the weight loss was about 14 grams, indicating about a 13% reduction, whereas in the case of the treatment with sodium silicate plus zinc sulfate the weight loss was less than 4 grams and the iron loss reduction was of the order of about 75%. An analysis of the scale showed that the red-tan scale formed without treatment contained about 2.5% of silica and held no zinc, whereas after treatment with the zinc sulfate-sodium silicate system, the color was a yellow tan and the coating contained about 16% of $SiO_2$ with a positive test for zinc showing that only a trace of zinc needs to be present in the film to be effective as an inhibitor.

EXAMPLE 2

In a further test, using a somewhat different water, one set of iron specimens was grounded to the plumbing while the second set was isolated above the plumbing ground. The grounded specimens represented a typical bimetallic corrosion condition. In such a system the zinc-silicate treated waters reduced corrosion by about 79%. In the ungrounded system, zinc-silicate treated water reduced corrosion about 67%. The same treating system was used as in the previous example with 30 p.p.m. of sodium silicate (8 p.p.m. $SiO_2$) plus 3 p.p.m. of zinc used for the first week to develop a precoat, and following that 10 p.p.m. of sodium silicate (2.7 p.p.m. $SiO_2$) and 1 p.p.m. of zinc for the remainder of the test.

In the bimetallic system, the instantaneous corrosion rate of the untreated water varied from about 9 to 5.5 with the lower values at the end of the run, whereas with the sodium silicate-zinc sulfate treatment the instantaneous corrosion rate was only about 2.4 to start and reduced regularly to 0.8 at the end of 36 days. The weight loss without treatment was 9.4 grams whereas the weight loss after treatment was only 2 grams, indicating a reduction in iron loss of about 79%. Since this is a bimetallic system, it is considered to represent the most severe form of corrosion.

In the specimens which were isolated above the plumbing potential, the iron loss is a direct loss by the corrosive action of the water and is considered the most common condition of corrosion within a distribution system. In this case, the weight loss of the after-treatment specimen was about 2.2 grams whereas the untreated specimen lost about 6.5 grams and the iron loss reduction was around 67%.

EXAMPLE 3

In a further example, the effect of raising the temperature to 152° F. compared to ordinary cold water was observed. The zinc-silicate combination reduced corrosion about 53% in the hot water system. This was about 7% less than in the untreated cold water system. Furthermore, when a test specimen was located several hundred feet downstream compared to a test specimen immediately following the treatment there was a 90% reduction in iron corrosion of the coupon nearest the treating solution and a 94% reduction in iron corrosion in the more remote coupon.

In the hot water test treatment, a test pipe was inserted in cold water and another following the hot water tank at 155° F. A third was placed in the system following the sodium silicate-zinc sulfate treatment. Its average temperature was about 152° F. The flow of water in the system was 1.25 gallons per minute. The specimens were iron whereas copper and brass pipe were used in the piping system. This test lasted for 80 days and 30 p.p.m. of sodium silicate (8 p.p.m. $SiO_2$) and 3 p.p.m. of zinc sulfate were used throughout.

The instantaneous corrosion rate in the cold water remained approximately constant at about 8 to 8.5 throughout the treatment, whereas in the hot water without treatment the instantaneous corrosion rate started at about 15 ma. and gradually reduced to about 5. In the after-treatment specimen, the instantaneous corrosion rate started at about 6 and dropped to about 2 in 44 days and changed little thereafter. The weight loss in the cold water specimen was about 16 grams whereas in the hot water untreated specimen it was about 31 grams. With the hot water treated specimen, the loss was about 15 grams. Thus, even in hot water the sodium silicate-zinc treatment provided more protection than the untreated cold water and reduced the loss of the untreated hot water by 53%.

EXAMPLE 4

In this test, coupons were located at distant locations in the flowing stream as well as close to the testing apparatus. One million gallons of water were used in a period of 45 days, with the water flowing at 15 gallons per minute.

The coupons were mild steel plates one inch by two inches by 1/16 of an inch held in slotted plastic supports, with the sides of the specimens normal to the flow stream. For the first 7 days the rate of addition of sodium silicate was 30 p.p.m. (8 p.p.m. $SiO_2$) and zinc was 3 p.p.m. as zinc sulfate while the remainder of the period 15 p.p.m. of sodium silicate (4 p.p.m. $SiO_2$) and 1.5 p.p.m. of zinc as zinc sulfate were added.

At the conclusion of the test, a heavy rust formation of ferrous bicarbonate was found on the coupon in the untreated water. The coupon nearer the treating solutions had a uniform corrosion scale which was black when wet and changed to white on drying. The more remote coupon was uncoated and the surface was virtually free from tuberculation. While the scale on the coupon in the untreated water was soft and easy to remove, the coupon itself was heavily etched on both sides and its section was considerably reduced near the outermost edge. The coupon nearest the treating solution showed an even loss of iron throughout its surface. The scale was quite hard to remove. It was found that the coupon nearest the treating solution had 90% less loss than the coupon in the untreated water, and the more remote coupon had 94% less loss than the untreated coupon.

This invention has numerous applications which will be immediately obvious to anyone skilled in this art. The reference to municipal waters herein is intended to include not only drinking water but also water which is used for other industrial purposes such as in cooling towers, heat exchangers, steam cookers, gas holder seals, metal dipping units, nuclear power reactors, as well as geothermal waters. However, the term municipal water is not intended to include brines or sea water.

What we claim is:

1. A method for decreasing the corrosion in the metallic portions of the distribution systems used for transporting or utilizing municipal water supplies which consists essentially of:
   (a) continuously introducing into the municipal water
      (1) sodium silicate having a $Na_2O:SiO_2$ ratio of between about 1:1.6 and 1:4, and
      (2) a soluble zinc metal salt,
   (b) maintaining the concentration of the sodium silicate in the municipal water within the range of between about 2 p.p.m. and 100 p.p.m. of $SiO_2$, and
   (c) maintaining the ratio of the sodium silicate solution to the zinc ion between about 5:1 and 15:1.

2. A method according to claim 1 wherein the concentration of sodium silicate in the municipal water is within the range of between about 10–20 p.p.m.

3. A method according to claim 1 wherein soluble zinc sulfate monohydrate is added downstream of the point of introduction of the sodium silicate.

4. A method according to claim 1 wherein the ratio of sodium silicate solution to the zinc ion is about 10:1.

5. A method according to claim 1 wherein sulfamic acid is also introduced in sufficient amount to prevent the precipitation of the zinc as zinc hydroxide.

6. A method according to claim 1 wherein tetrasodiumethylene-diamine tetraacetate is introduced in an amount sufficient to prevent the precipitation of the zinc as zinc hydroxide.

7. A method according to claim 1 wherein sodium hexametaphosphate is introduced in an amount sufficient to prevent the precipitation of the zinc as zinc hydroxide.

8. A process according to claim 1 wherein sulfamic acid and sodium hexametaphosphate are introduced in an amount sufficient to prevent the precipitation of the zinc as zinc hydroxide.

9. A method according to claim 1 wherein the soluble zinc metal salt is zinc sulfamate.

References Cited
UNITED STATES PATENTS

| | | | |
|---|---|---|---|
| 2,155,046 | 4/1939 | Griffith | 252—387 |
| 3,116,105 | 12/1963 | Kerst | 252—387 |
| 3,211,659 | 10/1965 | Pikaar | 252—142 |
| 3,215,637 | 11/1965 | Clerbois | 252—387 |
| 3,333,973 | 8/1965 | Freiman | 106—14 |

RICHARD D. LOVERING, Primary Examiner

I. GLUCK, Assistant Examiner

U.S. Cl. X.R.

21—2.7; 106—14; 176—64; 252—178, 387